Nov. 10, 1942.     H. LIST ET AL     2,301,424
APPARATUS FOR GENERATING EXTREMELY LARGE
SHORT-DURATION ENERGY IMPULSES
Original Filed May 19, 1936     5 Sheets-Sheet 1
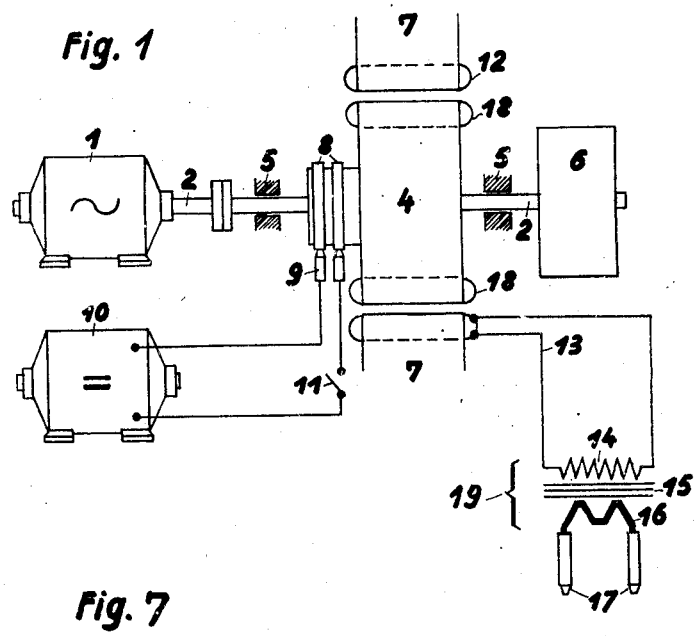
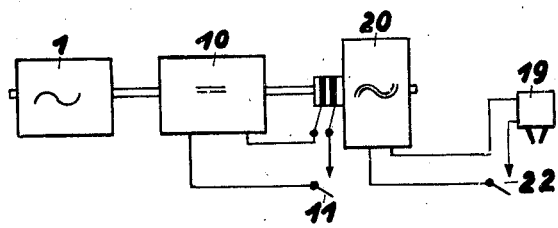
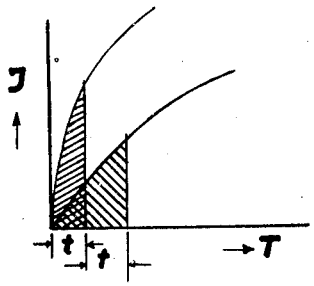
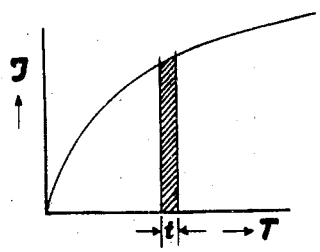
Inventors
HEINRICH LIST
GERHARD HAGEDORN
By Haseltine, Lake & Co. Attorneys

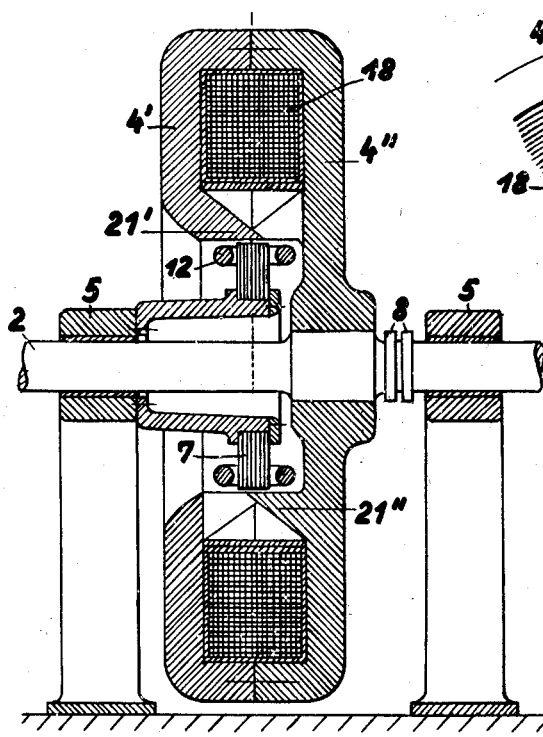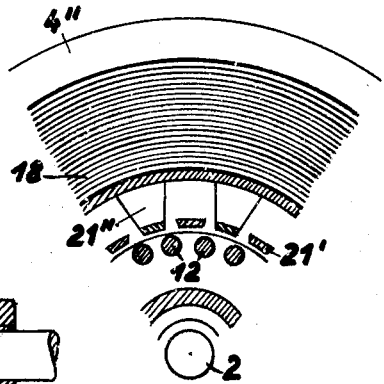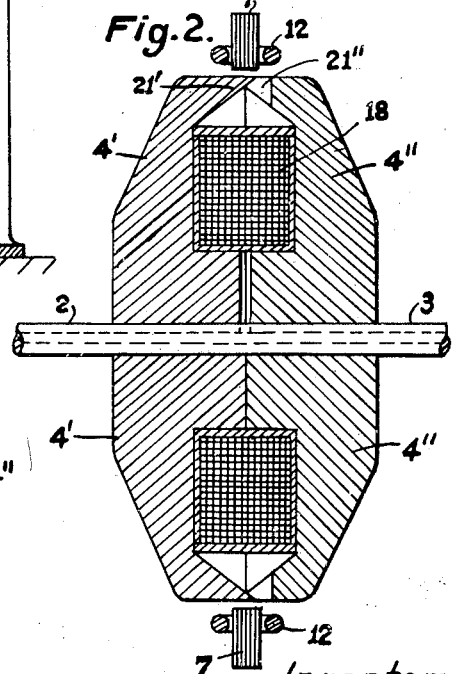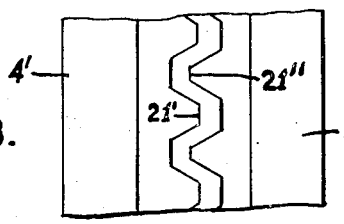

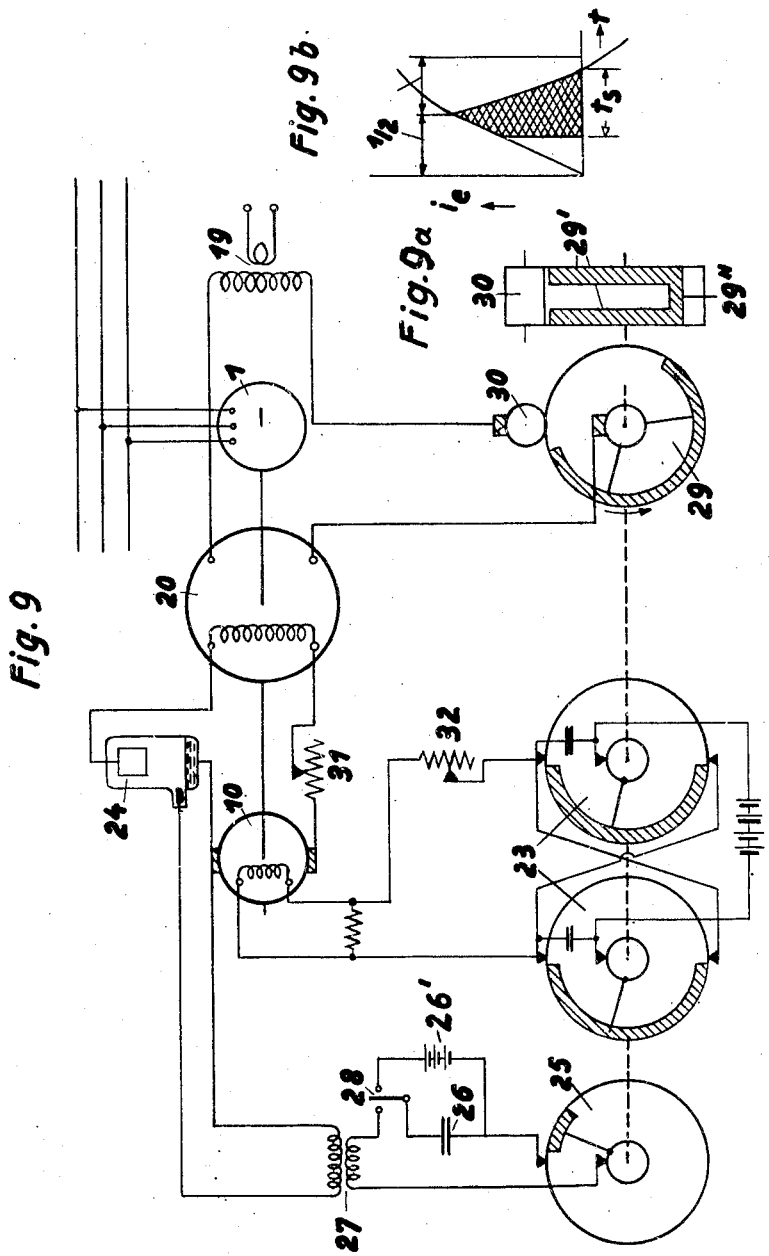

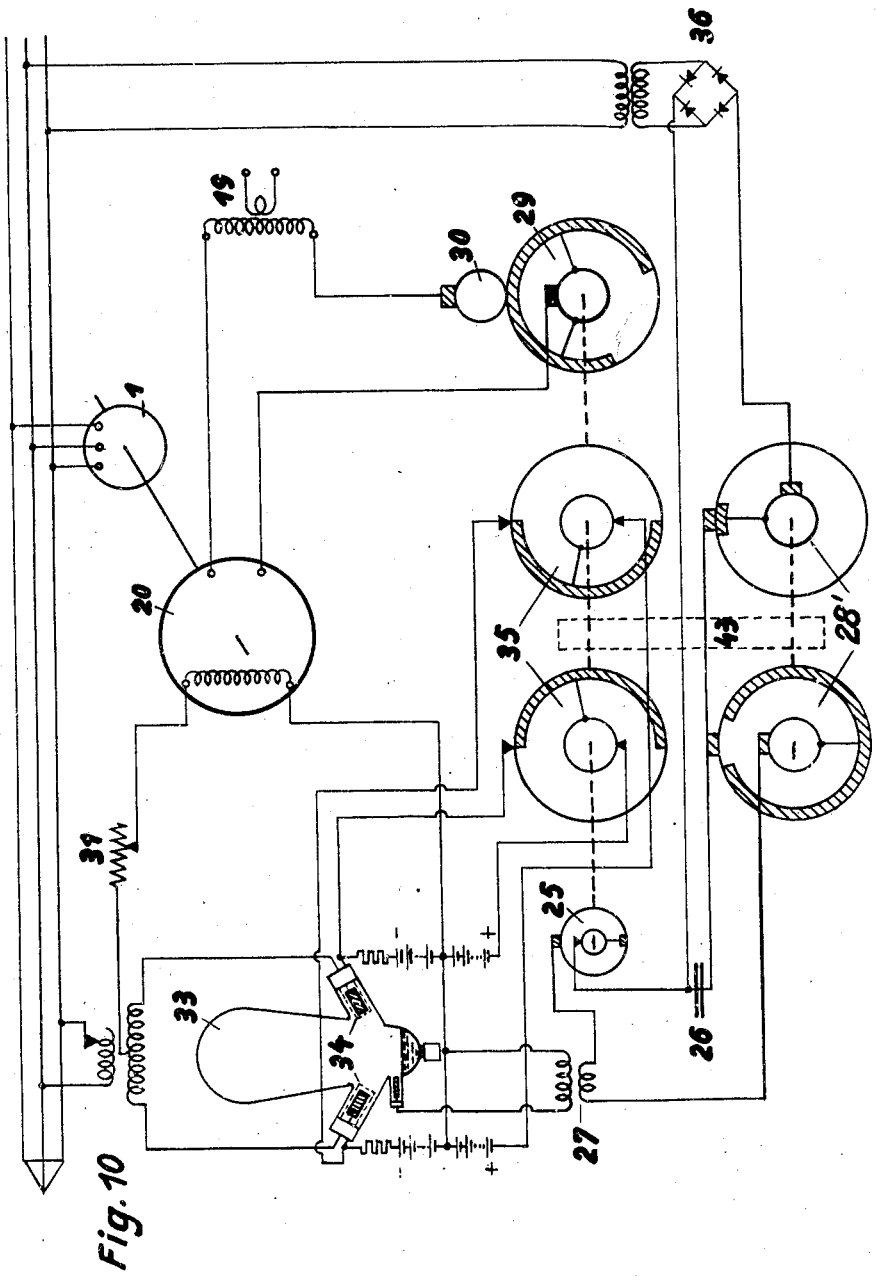

Patented Nov. 10, 1942

2,301,424

UNITED STATES PATENT OFFICE 2,301,424

APPARATUS FOR GENERATING EXTREMELY LARGE SHORT-DURATION ENERGY IMPULSES

Heinrich List, Berlin-Lichterfelde, and Gerhard Hagedorn, Berlin-Halensee, Germany; vested in the Alien Property Custodian Original application May 19, 1936, Serial No. 80,640. Divided and this application September 1, 1937, Serial No. 162,006. In Germany July 11, 1933

3 Claims. (Cl. 171—119)

The present invention relates to apparatus for generating relatively large electrical impulses for relatively short periods and this application is a division of our application Serial No. 80,640 filed May 19, 1936, which has matured into Patent No. 2,147,381, dated Feb. 14, 1939.

In the U. S. application Serial No. 707,480 filed on January 20, 1934, there is described a method and apparatus for the generation of extremely large short-duration energy impulses, particularly suitable for use in welding. The said apparatus comprises a so-called medium or high frequency alternator or an alternator whose frequency is higher than the usual mains frequency which may be for example from 60 to 100,000 cycles, the alternator field being moreover strongly over-excited and the mechanical energy stored in the rotating mass of the alternator being converted into extremely high short-duration energy impulses. The speed of rotation of the rotating mass and the field excitation are adjustable while the exciting current and the alternating current output of the current generator is limited by means of time switches or other means. The energy impulses for the momentary excitation of the alternator can if desired be derived from the rotational energy.

The present invention concerns an improvement or extension of the described apparatus for the production of extremely high short duration current impulses.

In a practical form of the invention, an exciting machine is provided for the excitation of the rotor of the alternator and this further permits the rate of growth of the exciting current to be varied.

Further control of the output energy can be obtained by including in addition to a switch (preferably adjustable as to its timing) which is provided between the exciting current source and the exciting winding of the rotor a further switch in the intermediate or high frequency current circuit between the alternator and the transformer.

The switch in the medium or high frequency current circuit is preferably in this case made dependent as regards its operation upon the switch arranged between the exciting source, for example the exciting machine, and the exciting winding of the rotor, and in such manner that first the switch in the exciting circuit and then the switch in the primary circuit of the transformer is closed and after the required time the switch in the exciting circuit is again opened.

For the switches in the medium or high frequency current circuit, or in the exciting current circuit of the medium or high frequency generator, or in the exciting current circuit of the exciting machine gas or vapour discharge devices with or without grids, or mechanically operated switches such as switches driven synchronously with the alternator, said switches preferably being in the form of drum switches with sliding or rolling contacts and movable contact segments, or cam actuated switches or electromagnetic switches may be employed, the interdependence of the intermediate or high frequency current circuit switch means and the exciting current circuit switches being obtained by direct or indirect coupling of the switchdrums, contact discs or cams which run with suitable relative adjustment synchronously with the current generator the switching on of the excitation or the release or ignition of the discharge devices being dependent upon a time switch arrangement preferably controlling a condenser discharge. The momentary switching on of the excitation can be effected by an alternating current in the exciting current circuit of the medium or high frequency alternator or that of its exciting machine or in the latter by reversing the polarity of a direct current, in which case a discharge device arranged in the main exciting circuit or a reverse current breaker blocks the exciting current in the reverse direction, the reversal of polarity of the direct current being effected by means of a reversing switch constructed in the form of a contact disc which rotates synchronously with the alternator. The excitation of the alternator can, moreover, be effected by alternating current which is rectified by vapour or gas discharge devices the rectifier devices having grids which are controlled by synchronously rotating contact discs. It can finally be effected by mechanical switch means, for example by means of drum switches or cam actuated switches which are driven synchronously with the alternator.

The control of the medium or high frequency current circuit can be effected if desired by mechanical switches such as drum switches or cam actuated switches driven synchronously with the alternator or by grid-controlled discharge devices such as gas discharge devices whose grids are mechanically controlled for example directly by means of contact discs or indirectly through electron discharge devices, the contact discs rotating synchronously with the alternator.

The employment of the above described simple mechanical switches in the medium or high frequency current circuit is possible because in the arrangement in accordance with the invention interruption of the circuit does not take place under load.

In all switching arrangements the ignition of the discharge devices, or the actuation of the closing coil of the reverse current breaker or of relays is effected by the discharge of a condenser through an ignition transformer or through the closing coil. The condenser can in addition be charged and discharged either by means of contact discs or by a hand actuated switch. A further contact disc in the discharge circuit may serve for the starting of the ignition or the switch actuation. The condenser discharge may, moreover, take place only through the last mentioned contact disc and the charging always through a resistance. Moreover this contact disc runs synchronously with the medium or high frequency alternator.

Since the arrangement comprising ignition, control and switch drums or discs runs synchronously with the medium or high frequency alternator and is adjustable as to speed and the discs or their contact segments are relatively adjustable any desired switching relationship and sequence can be obtained.

The following several embodiments of the apparatus in accordance with the invention will be described by way of example with reference to the drawings.

Figure 1 shows schematically the general arrangement;

Figure 2 is a section through the rotor and the stator of the alternator in the arrangement in accordance with the invention;

Figure 3 is a plan view of an unwound part of the periphery of the rotor;

Figure 4 is a section through another embodiment of the alternator;

Figure 5 is a part section of the generator shown in Figure 4;

Figure 6 is a graphical representation which shows the growth of current in two cases;

Figure 7 shows schematically the connection diagram in a modified embodiment of the invention;

Figure 8 is a graphical representation which shows the growth of current in the embodiment in accordance with Figure 7;

Figure 9 is a circuit diagram of a further embodiment of the invention;

Figure 9a is a typical representation of a drum switch;

Figure 9b is a graphical representation of the curve of the exciting current of the alternator;

Figure 10 shows a circuit arrangement for one embodiment of the invention in which a rectifier, for example an incandescent cathode or mercury vapour rectifier, is employed as the switching means in the exciting circuit;

Figure 11:
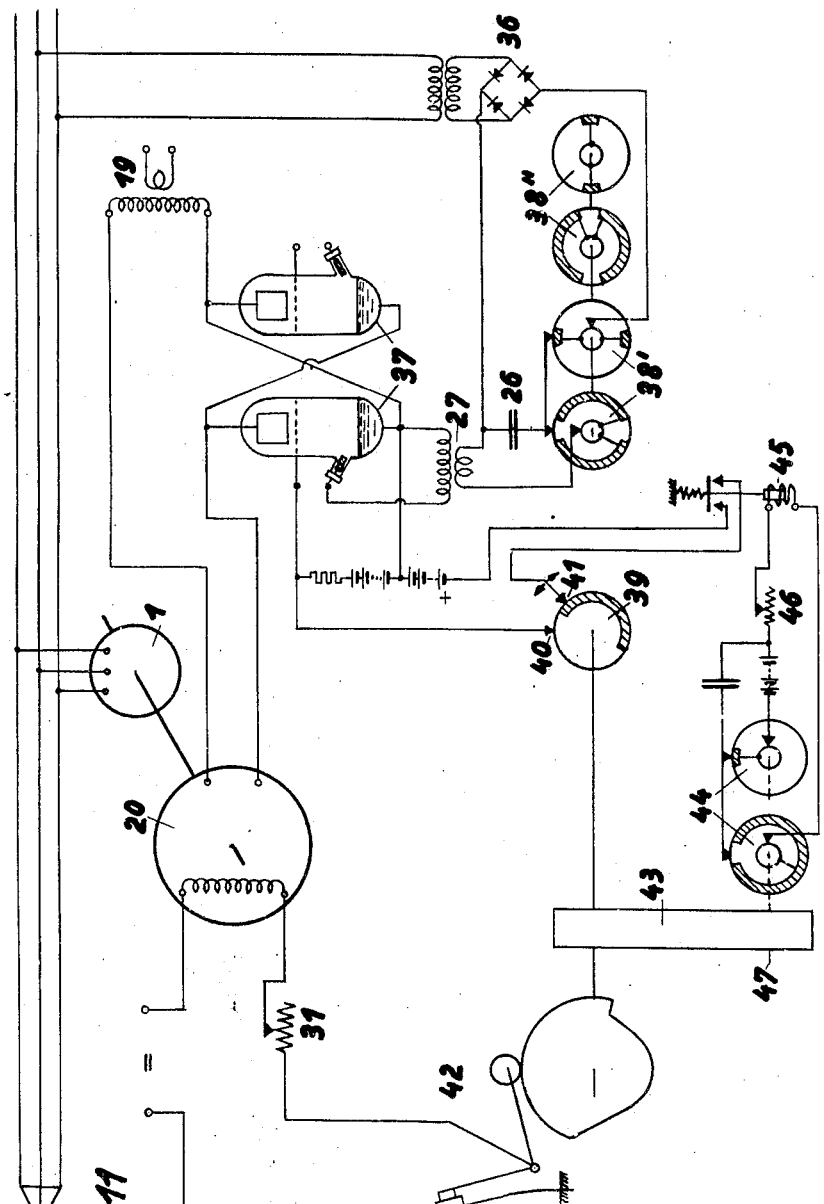
Figure 11 shows an embodiment in which grid controlled gas or vapour discharge tubes are employed as switching means in the medium or high frequency current circuit.

Referring to Figure 1, the driving motor is indicated at 1 and is coupled to the shaft 2 of a medium or high frequency alternating current generator having a rotor 4. The shaft 2 is carried in bearings 5 and is provided with an additional flywheel 6. The shaft 2 is divided between the motor 1 and the rotor 4 the two portions thereof being connected by means of a coupling. The rotor 4 may be constructed in different ways as will be more fully explained hereinafter. In particular it may be constructed as a toothed rotor whose exciting winding may consist of individual pole or zig-zag windings. The stator 7 which surrounds the rotor 4 includes slots in which is wound an alternating current winding 12. The exciting current is conducted to the exciting winding 18 on the rotor through slip-rings 8 and brushes 9 from an exciting machine 10. In the exciting current circuit is a switch 11 which may for example be a time-controlled switch. The medium or high frequency current induced in the stator of the alternator is led by means of conductor 13 to the primary winding 14 of a medium or high frequency transformer 19 having an iron core 15. From the secondary winding 16 the transformed current is then led, if the arrangement is used, for example, for resistance welding to electrodes 17.

The exciting winding 18 is very much larger than in a normal alternating current generator of like size and like frequency in order that the strong reaction on the part of the loaded stator 7, which effects a de-excitation and considerable neutralisation of the field between the poles of the rotor 4, may be counteracted in spite of the fact that considerable fields are forced through the stator iron.

In carrying out the invention the cross-section of the air gap between the rotor and stator is, with a view to a reduction of demagnetisation, made as small as possible and the flux density as large as possible. The rotor 4 is, for example, so constructed that the exciting winding 18 is enclosed by claw-like intercalated pole teeth 21' and 21" which with a view to keeping the demagnetisation at a minimum only over-lap to a slight extent. The tips of the teeth 21', 21" have only a very small cross section while the cross section of the iron at the roots of the teeth increases rapidly relatively to the increase in the magnetic flux. The rotor 4 in this construction comprises two disc-shaped halves 4', 4" which are keyed on the shaft 2 (which is bored out at 3 for the leads to the energising winding 18) the arrangement being such as to leave a sufficiently wide annular space for the energising winding 18. The exciting winding 18 is held in place by means of a band of non-magnetic material (Figure 2).

The rotor 4 is located about the stator 7 having a stator winding 12. The stator 7 is built up from iron stampings and its breadth is preferably less than the distance between the roots of the teeth of the two rotor halves 4', 4" (Figure 3).

In addition to the large cross sectional dimensions of the iron core of the rotor 4 for the purpose of obtaining a small magnetic reluctance a considerable rotating mass is provided in the rotor so that the loading impulses occurring with short-duration extremely large current impulses are taken up by the rotational energy of the rotor which acts as a flywheel and a separate flywheel is in certain cases entirely unnecessary.

In Figure 4 an embodiment of a medium or high frequency alternating current generator is shown constructed as an external rotating field machine. In this case also the abnormally large energising winding 18 is enclosed by claw-like intercalated pole-teeth. The two rotor-halves 4' and 4" are preferably bolted together while one of the halves is keyed on the shaft 2. The rotor may, however be built up from more than two parts if desired. The abnormally large energising winding 18 is again energised through slip rings 8 from an exciting machine or the like. The halves 4' and 4" of the rotating field system carry on the inner peripheries the teeth 21' and 21" whose cross section, as in the previous embodiment rapidly increases from tooth-tip to tooth-root and the greatest possible distance from one another is maintained and they are only slightly intercalated.

The stator 7 which is built up from stampings is arranged inside the rotor on a hub or the like which for example may be fixed to the bearing 5 of the medium or high frequency alternating current generator. The stator 7 carries the alternating current winding 12 as will be apparent from Figure 5.

From Figure 1 it is apparent that the duration of the excitation of the medium or high frequency current generator is dependent upon the duration of contact of the switch 11 which may be constructed as a time switch. The time switch 11 as is known permits of only one adjustment for different durations of contact. With this switch, however, merely a limitation of the excitation within the required short time may be obtained. In carrying out the invention the amount as well as the effective duration of the excitation is made variable by variation of the growth of current with time in the rotor so that having regard to the application of the apparatus, for example the characteristics of the welding material, a variation of the time with maintenance or variation of the amount of energy applied to the welding material can be obtained. The variation of the growth of current with time can be obtained by adjustment of the voltage of the exciting machine. With an increase in the voltage a more rapid current growth is obtained as is apparent from Figure 6.

In the embodiment according to Figure 7 there is employed in addition to the above mentioned time switch 11 between the exciting machine 10 and the exciting winding 18 in the rotor 4 a switch 22 in the connection to the transformer 19.

The switch 22 is made dependent as regards its operation up the switch 11 in such a way that as a result of co-operation of the two switches the energy output, for example for the welding process, is fixed. From Figure 8 it is apparent that in this case in addition to the variation in time and the current growth with time there is also obtained a displacement of the working point on the characteristic.

By closing the switch 11 the excitation of the rotor 4 of the generator commences according to the current-growth curve of Figure 8, without energy output to the transformer 19 taking place because the switch 22 is still open. After a period to be chosen at will in dependence upon the application of the apparatus the switch 22 is closed so that the transformer 19 receives a current impulse whose time duration is limited, for example, by opening the switch 11. By reason of this displacement of the working point a second increase of the amount of energy within the limited allowable time is rendered possible accompanied if desired, by a shortening of the effective duration.

Further the switch which must operate under very heavy load conditions is used only for a switching on, which is effected without difficulty, and not for switching off so that it can be made of particularly simple construction.

In the embodiment of the apparatus according to Figure 9 the duration of the energy impulse is substantially reduced by reducing the exciting current for the medium or high frequency current generator to zero by rapid reversal of the polarity of the voltage, a discharge device or a reverse current switch being arranged in the exciting circuit for preventing any growth of current in the reverse direction.

The reversal of polarity of the exciting direct current voltage of the exciter machine 10 is, in the embodiment shown in Figure 9, obtained by means of two contact discs 23. Shortly after the switching on of the excitation by means of the contact discs 23 a vapour discharge device 24 is rendered conductive through a contact disc 25 which determines the timing. The actual ignition of the device 24 results from the discharge of a condenser 26 through a high voltage transformer 27. The condenser 26 is charged through a change-over switch 28 by means of a battery 26'. The ignition of the vapour discharge device 24 then only commences if the switch 28 is brought from the charging into the discharging position. In the main current circuit of the medium or high frequency current alternator 20 is connected a further switch drum 29. The duration of the discharge of the condenser 26 is preferably smaller than the time of one rotation of the switch drum 29 controlling the main current. In this case the working current, for example the welding current, always flows only during one rotation of the switch drum 29 and for each current impulse for one welding spot, for example one reversal of the switch 28 is necessary. The switch 28 therefore permits the occurrence of the current impulse to be determined; it may be actuated by hand or automatically.

After reversal of polarity of the exciting voltage of the exciting machine 10 by means of the contact disc 23 the main exciter current sinks rapidly to zero. The discharge tube 24 prevents its growth in the reverse direction. In place of this tube a mechanical reverse current breaker may be employed whose closing coil may be actuated if desired from the condenser circuit.

The main switch between the medium or high frequency current alternator 20 and the transformer 19 can with advantage be constructed as a switch drum 29 with a rolling contact 30. The roller contact arrangement has the advantage that the friction despite high contact pressures and consequent small contact resistance remains small and also the advantages of no contact bounce on making circuit and no smearing of the insulation by metal or carbon dust. The switch drum 29 comprises contact segments 29" and relatively movable contact segments 29' which effect the make and break of the main current circuit (Figure 9a). Instead of a roller contact a sliding contact may of course be employed or instead of a switch drum a cam actuated switch may be used.

Since it is desired always to make contact at a predetermined and constant instant with respect to the alternating voltage the switch drum 29 is so coupled with the driving shaft 22 of the current generator 20 and the relative adjustment is so selected that the switching on of the main current only takes place in a predetermining position of the rotor with respect to the stator winding.

The adjustment of the duration of the current impulse is effected by alternation in the speed of revolution of the switch drum 29 or by displacement of the segments 29' relative to the segment 29" (in the direction of the arrow). A displacement of the contact segment 29' involves a displacement of the contact disc 23 since the circuit through the contact segment 29' must be broken exactly in the short period of time in which there is no excitation (in the position shown). The adjustment of the exciting current for the alternating current generator 20 may be effected in simple manner by adjustment of the resistances 31 and 32 which are connected in the excitation circuit of the generator and of the exciting machine 10 respectively.

If moreover the reversing switch 23 has only to deal with relatively very small currents it can advantageously effect the excitation of the exciting machine 10 or the current generator 20 itself, from an alternating current source.

The switch drum 29, the reversing switch 23 and the ignition switch 25 run synchronously with the medium or high frequency current generator 20. They may be arranged as relatively movable contact segments on a common drum. Further in place of the reversing switch 23 a cam actuated switch may be employed.

Figure 9b shows the curve of exciting current of the generator 20 plotted against time during one revolution of the switch drum 29. The rise and fall of the exciting current may take place during one half a revolution of the reversing switch 23 although the main switch 29 is closed only during the time period $t_s$.

In the embodiment in accordance with Figure 10 the excitation of the medium or high frequency current generator 20 is provided by a grid controlled rectifier 33 from the A. C. mains. The connections to the rectifier 33 are shown as for single phase only for the sake of simplicity. By application of negative voltage to the grids 34 of the rectifier 33 any half waves of reverse current are blocked. The release of the excitation current is effected in a known manner by the application through controlling contact discs 35 whose contact segments extend approximately half way round the discs of positive voltage in opposition to the negative voltage permanently applied to the grid 34. The control discs 35 are adjustable so that according to their position relative to the phase of the half waves of current controlled thereby the latter may be individually blocked or passed, cut off or limited. The ignition of the rectifier 33 takes place as in the embodiment in accordance with Figure 9, the switch 28' shown therein for the charge and discharge of the condenser 26 being made automatic. With equal speeds of rotation of the control and ignition switch shafts, energy is applied to the main circuit at each revolution; at half the speed of rotation of the ignition shaft this on the contrary takes place at each second rotation of the control switch shaft and so on. It is therefore possible to make the intervals between the current impulses as large as desired by variation in the coupling of the two shafts for example by driving the ignition control shaft through an adjustable drive 43. The voltage for the ignition device may, for example, be derived from a dry rectifier 36 fed from the mains. The switching of the main circuit of the medium or high frequency current generator may as in the embodiment according to Figure 9, be effected by means of the switch drum 29 having roller or sliding contacts and wherein the switching period $t_s$ is adjusted by movement of the contact segments 29' relatively to the contact segments 29" or by alteration of the speed of rotation of the switch drum 29. The main switch 29, the control switch 35 and the ignition switch 25 run, with suitably adjustable coupling synchronously with the current generator 20 and may be arranged in similar manner to the device according to Figure 9.

Figure 11 shows a circuit arrangement in which between the medium or high frequency current generator and the transformer 19, grid controlled gas discharge devices 37 with ignition control are employed as switches. In Figure 11 two discharge devices 37 are shown for controlling both half waves. Alternatively the two discharge paths which are connected in opposite sense can be arranged in one envelope, or only one discharge system with two similar electrodes alternating as cathode and anode may be employed for both half waves of the alternating current with suitable ignition control.

The ignition of the discharge devices 37 is effected for example in similar manner to that in the circuit according to Figures 9 and 10. Contact discs 38' which serve for the charging and discharging of condenser 26 run synchronously with the current generator 20 and effect ignition of the corresponding discharge device at the beginning of the positive half wave for example. For the second discharge device corresponding connections are provided and these are not further described. The switch discs 38" associated therewith are displaced by 180 electrical degrees. In Figure 11 the segments of the switch discs 38' and 38" are shown for the case of a four pole machine which therefore provides two positive and two negative half waves per revolution.

The adjustment of the timing is effected by the contact disc 39 with the contacts 40 and 41. If both contacts are short circuited through the segment the grid similarly to the grid control of the rectifier 33 in accordance with Figure 10, is at a positive voltage. Moreover the contact disc 39 rotates synchronously with the current generator 20 because the output of a half wave of current always must take place only at a predetermined moment in a voltage wave. The speed of rotation of the contact disc 39 can for the purpose of adjusting the time of contact be altered for example by driving through an adjustable drive. A fine adjustment may be effected by shifting contacts 41 in the direction of the arrow.

On the same shaft is arranged the exciting switch 42 here shown by way of example as a mechanical cam actuated switch. In this arrangement at each rotation of the shaft a current impulse is produced in the transformer 19 and this results in an uninterrupted series of impulses. In order that intervals or gaps may be inserted the following arrangement is necessary:

Contact discs 44 are actuated through an adjustable drive 43. At each rotation a condenser is charged and discharged through a relay 45. The duration of contact of the relay can be regulated by means of the resistance 46. The positive pole of the grid battery serving for the release of the positive half waves of current is connected through the relay contacts. With the contacts of the relay open the discharge tubes 37 are permanently blocked. Alternatively by means of the relay control the ignition of the direct current source can be effected in order to insert intervals between the individual impulses.

For single current impulses the shaft 47 can be uncoupled and actuated by hand.

A very rapid series of current impulses can, on the contrary, be obtained with closed relay contacts and permanently connected excitation and this can be effected for example by uncoupling the cam disc of the excitation switch 42 or by a further switch arranged in parallel therewith.

The contact discs 38' and 38'' serving for grid control and for ignition control of the discharge tubes 37, may be replaced by electron discharge tubes whose control may be effected in known manner by contact discs.

The foregoing described circuits may, especially in the case where large currents in the exciter and medium or high frequency current generator circuits are to be controlled and short contact periods are in question, be so combined that the switching arrangement according to Figure 11 is used for the medium or high frequency current circuit together with one of the two switching arrangements according to Figures 9 or 10 for the exciting circuit. Likewise it may be convenient in the case of certain switching requirements for both the current circuits to be controlled by drum switches with roller or sliding contacts or either of these may be replaced by cam actuated switches.

Whereas in the apparatus for the generation of extremely large short duration energy impulses according to the present invention frequencies higher than the usual commercial frequency of 60 cycles up to 100,000 cycles may be used, it is preferred to employ frequencies of 200–300 cycles to 10,000 cycles.

Having now fully described our invention, we claim:

1. Electrical apparatus for the generation of and welding by means of extremely large electrical impulses of short duration, comprising an alternating current generator with its associated main circuit and exciter circuit, a transformer in the main circuit, rotatable switching means in said main circuit for closing the latter and starting the current flowing in said main circuit and thereby starting a welding period, a separate exciter in the exciting circuit for exciting said generator, additional rotatable switching means connected to said exciter and having switching members for exciting and de-exciting said exciter, means causing the first mentioned switch means and the additional switch means to be rotated together, and a discharge tube in the exciter circuit between the generator and the exciter having control means connected thereto for ensuring constant polarity of the exciting current and preventing reversal of the polarity of said latter current.

2. Electrical apparatus, according to claim 1, wherein the discharge tube is of the vapor discharge type and the control means connected thereto include a second transformer, the source of current supply, the third rotatable switching means and charging and discharging control means.

3. Electrical apparatus, according to claim 1, wherein the discharge tube is of the vapor discharge type and the control means connected thereto include a second transformer connected to said tube and to the exciter, a third rotary switching means connected to said transformer, a condenser connected to said switching means, and a current source also connected to said switching means, and a charging and discharging control means connected to said condenser and capable of connecting the condenser to the transformer or to said current source, and wherein the additional switching means includes two rotatable switches which are rotatable, together with the first switching means and means are included for rotating the third switching means, together with the first and additional switching means and synchronously with the generator.

HEINRICH LIST.
GERHARD HAGEDORN.